(12) United States Patent
Ducos

(10) Patent No.: US 9,073,629 B2
(45) Date of Patent: *Jul. 7, 2015

(54) MAIN LANDING GEAR OF AN AIRCRAFT, COMPRISING TWO WALKING BEAMS JOINED TO THE STRUCTURE OF THE AIRCRAFT IN AN ARTICULATED MANNER

(75) Inventor: Dominique Ducos, Savigny sur Orge (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 40 days.

This patent is subject to a terminal disclaimer.

(21) Appl. No.: 13/699,911

(22) PCT Filed: Jun. 16, 2011

(86) PCT No.: PCT/EP2011/060071
§ 371 (c)(1),
(2), (4) Date: Nov. 26, 2012

(87) PCT Pub. No.: WO2011/157807
PCT Pub. Date: Dec. 22, 2011

(65) Prior Publication Data
US 2013/0068884 A1    Mar. 21, 2013

(30) Foreign Application Priority Data

Jun. 16, 2010    (FR) .................................... 10 54775

(51) Int. Cl.
| | | |
|---|---|---|
| *B64C 25/10* | (2006.01) | |
| *B64C 25/34* | (2006.01) | |
| *B64C 25/14* | (2006.01) | |
| *B64C 25/12* | (2006.01) | |

(52) U.S. Cl.
CPC ................ *B64C 25/10* (2013.01); *B64C 25/14* (2013.01); *B64C 25/34* (2013.01); *B64C 2025/125* (2013.01)

(58) Field of Classification Search
CPC .. B64C 2025/125; B64C 25/10; B64C 25/34; B64C 2025/10; B64C 25/02; B64C 25/14; B64C 25/22

USPC ............... 244/102 R, 102 SL, 102 SS, 102 A
See application file for complete search history.

(56) References Cited

U.S. PATENT DOCUMENTS 2,459,982 A * 1/1949 Wells ........................ 244/102 R
2,578,200 A * 12/1951 Nicholl ..................... 244/104 R
(Continued)

FOREIGN PATENT DOCUMENTS

| EP | 0 631 929 A | 1/1995 |
| FR | 1.409.467 A | 8/1965 |
| FR | 1409467 A * | 8/1965 |

OTHER PUBLICATIONS

English Machine Translation of FR 1,409,467.*

Primary Examiner — Valentina Xavier
Assistant Examiner — Alexander V Giczy
(74) Attorney, Agent, or Firm — Sughrue Mion, PLLC

(57) ABSTRACT

An aircraft undercarriage comprising two rocker beams (1, 2) carrying wheels and mounted to pivot on a common pivot (Y1), the undercarriage including a shock-absorber device comprising two connecting rods (5, 6), each rod (5, 6) being coupled to a respective rocker beam, at least one connecting rod being telescopic and forming a shock absorber. The two connecting rods also are coupled to a rocker (7) pivotally mounted on a central pivot (8), wherein the common pivot of the rocker beams is secured to a structure of an aircraft to which the undercarriage is fastened and is mounted in a fixed position on the structure. The central pivot of the rocker is movable between a first position (rocker beams in a landing position) and a second position in which a rocker has pulled on the connecting rods to cause the rocker beams to pivot towards a retracted position of the undercarriage.

5 Claims, 3 Drawing Sheets

(56) References Cited

U.S. PATENT DOCUMENTS

| | | | | |
|---|---|---|---|---|
| 2,589,434 A * | 3/1952 | Robert | ...................... | 244/102 R |
| 2,868,482 A * | 1/1959 | Westcott, Jr. | ............. | 244/102 R |
| 3,514,057 A * | 5/1970 | Biggs | ........................ | 244/102 R |
| 3,904,153 A * | 9/1975 | Watts | .............................. | 244/50 |
| 4,402,477 A * | 9/1983 | Turiot et al. | ............... | 244/102 R |
| 2009/0321560 A1* | 12/2009 | Luce et al. | ................ | 244/102 R |

* cited by examiner

MAIN LANDING GEAR OF AN AIRCRAFT, COMPRISING TWO WALKING BEAMS JOINED TO THE STRUCTURE OF THE AIRCRAFT IN AN ARTICULATED MANNER

CROSS REFERENCE TO RELATED APPLICATIONS

This application is a National Stage of International Application No. PCT/EP2011/060071, filed on Jun. 16, 2011, which claims priority from French Patent Application No. 10 54775, filed on Jun. 16, 2010, the contents of all of which are incorporated herein by reference in their entirety.

The invention relates to a main aircraft undercarriage having two rocker beams hinged to the structure of the aircraft.

TECHNOLOGICAL BACKGROUND

In the field of military transport airplanes, aircraft are known that have main undercarriages fastened to a side structure of the fuselage, such as for example the C160 Transall or the A400M. In general, main undercarriages are arranged on either side of the fuselage, and on each side they are arranged one behind another. In general, each undercarriage has a rocker beam with one end that receives an axle carrying two wheels. The rocker beam is hinged about a transverse axis, either to a leg of the undercarriage, or else directly to a structure that is secured to the fuselage. Under such circumstances, a retraction device pulls on the shock absorber connected to the rocker beam in order to turn it towards a retracted position in which the rocker beam and the wheels are received inside a lateral fairing of the fuselage.

Wing undercarriages are also known comprising a leg that is hinged under the wing about a hinge axis, with the bottom end of the leg carrying a pivot on which there are hinged two rocker beams each carrying an axle, one of the rocker beams extending forwards and the other of the rocker beams extending rearwards, e.g. as in the Caravelle or Nimrod airplanes. The undercarriage includes a shock absorber device comprising two connecting rods coupled to respective ones of the rocker beams, at least one of the connecting rods being telescopic and forming a shock absorber, the two connecting rods also being coupled to a rocker that is pivotally mounted on a pivot of the leg of the undercarriage. The assembly is pivotable as a whole about the hinge axis of the leg in order to be a retracted into the structure of the aircraft.

OBJECT OF THE INVENTION

An object of the invention is to provide a fuselage undercarriage combining the advantages of the above-described configurations.

BRIEF SUMMARY OF THE INVENTION

In order to achieve this object, the invention provides an aircraft undercarriage comprising two rocker beams carrying wheels and mounted to pivot on a common pivot that is secured to the structure of the aircraft and that is mounted in a fixed position thereon, the undercarriage including a shock-absorber device comprising two connecting rods, each coupled to a respective one of the rocker beams, at least one of the connecting rods being telescopic and forming a shock absorber, the two connecting rods also being coupled to a rocker pivotally mounted on a central pivot that is movable between a first position in which the rocker beams are in a landing position, and a second position in which the rocker beams are in a retracted position.

Thus, the rocker beams are hinged directly to the structure of the aircraft, and in order to retract the rocker beams, the rocker is used, with its pivot being moved to pull on the connecting rods coupled to the rocker beams in order to move the axle rods towards the retracted position.

BRIEF DESCRIPTION OF THE FIGURES

The invention can be better understood in the light of the following description of the figures of the accompanying drawings, in which.

DETAILED DESCRIPTION OF THE FIGURES

Figure 1:
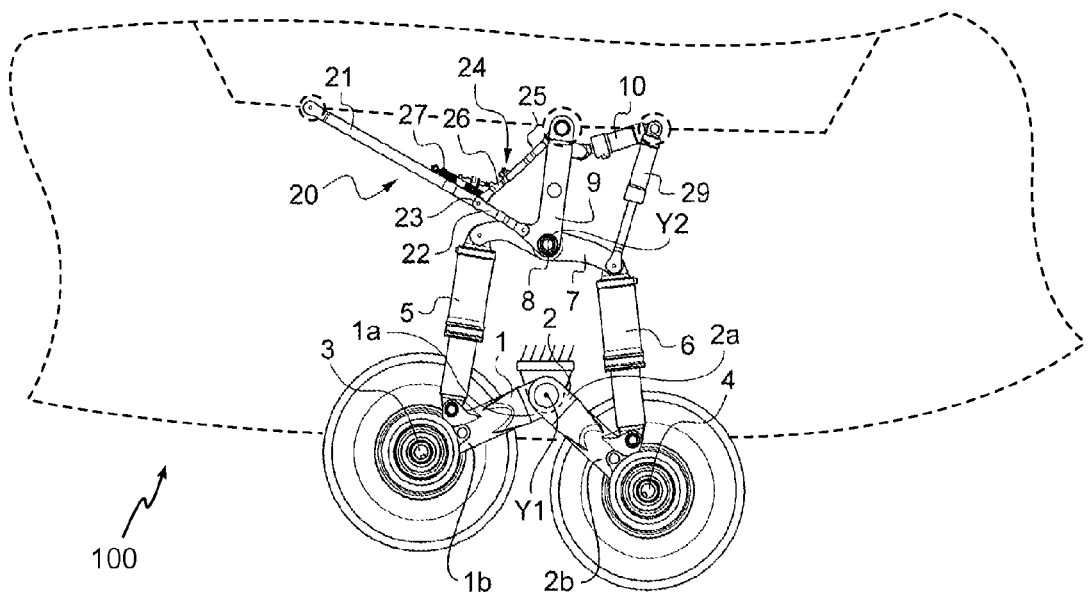
FIG. 1 is a side view of a fuselage undercarriage in a particular embodiment of the invention, the undercarriage being shown in its deployed position before landing, two of its wheels being omitted for greater clarity.

With reference to FIGS. 1, 2, 3, 4, and 5 the undercarriage of the invention has two rocker beams 1, 2 having proximal ends 1a, 2a that are both hinged on a common fixed pivot (not shown, but its axis Y1 can be seen) that is secured to the aircraft 100 and that projects laterally from the fuselage of the aircraft 100 in a direction that is substantially horizontal. The rocker beams 1, 2 have respective distal ends 1b, 2b receiving respective axles 3, 4, each carrying two wheels.

Two shock absorbers forming telescopic connecting rods 5, 6 are coupled firstly to the rocker beams 1, 2 and secondly to the ends of a rocker 7.

Figure 6:
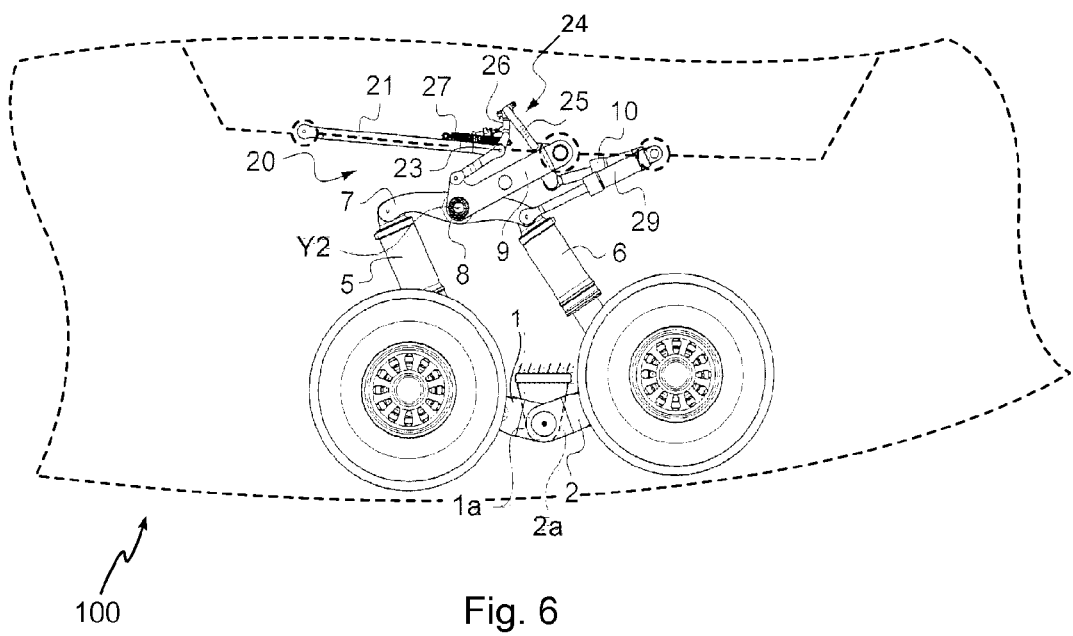
FIG. 6 is a side view of the undercarriage in the retracted position.

The rocker 7 is pivotally mounted on a central pivot 8 extending along an axis Y2 and carried at the bottom end of a panel 9, the top end of the panel 9 being hinged to a stationary pivot extending along an axis Y3 secured to the fuselage of the aircraft 100. A driving actuator 10 coupled between the fuselage and the panel 9 serves to cause the panel to pass from an active position shown in FIGS. 1, 2, 3, 4, and 5 in which the panel 9 holds the central pivot 8 of the rocker substantially vertically in register with the common pivot of the rocker beams 1, 2, this position corresponding to the rocker beams being in the landing position, and a retracted position that is shown in FIG. 6, in which the panel 9 has pivoted and pulled on the rocker 7, which has itself pulled on the shock absorbers 5, 6 to cause the rocker beams 1, 2 to pivot about their common pivot and thus retract the rocker beams and the wheels into a lateral housing in the fuselage (not shown).

The undercarriage is fitted with a device for stabilizing the panel 9 in the active position, the device in this example comprising a brace 20 coupled between the fuselage and the panel 9, and including in known manner two arms 21, 22 that are hinged together via a knee 23 and that are held in a substantially aligned position by means of a locking member 24 comprising two hinged-together links 25, 26 that are urged towards a substantially aligned position by a spring member 27 holding the links in mutual abutment in said substantially aligned position. An unlocking actuator 28 is mounted to break the alignment of the links of the locking member against the return member, thereby enabling the arms of the brace to be folded, and thus enabling the panel 9 to be pivoted from its active position towards its retracted position.

Figure 2:
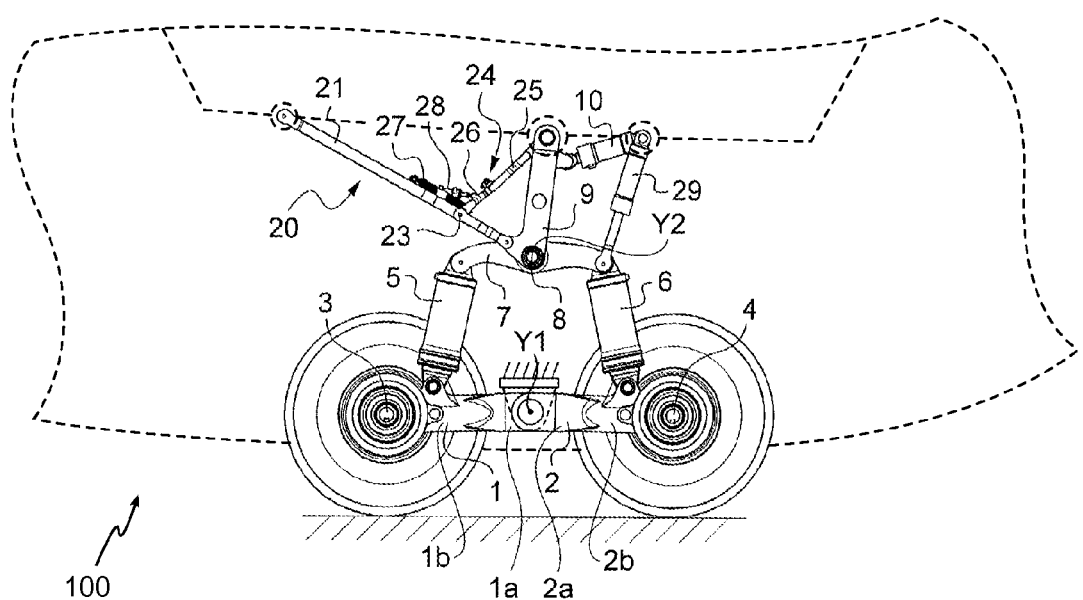
FIG. 2 is a figure analogous to FIG. 1, showing the undercarriage in its deployed position after landing.
Figure 3:
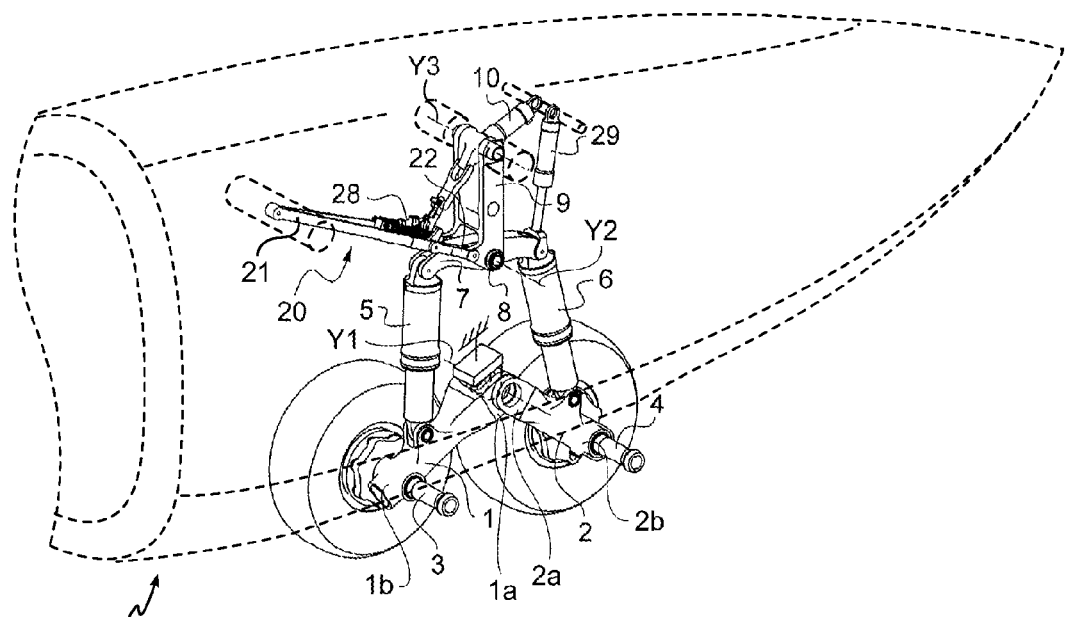
FIG. 3 is a perspective view of the undercarriage as shown in FIG. 1.
Figure 4:
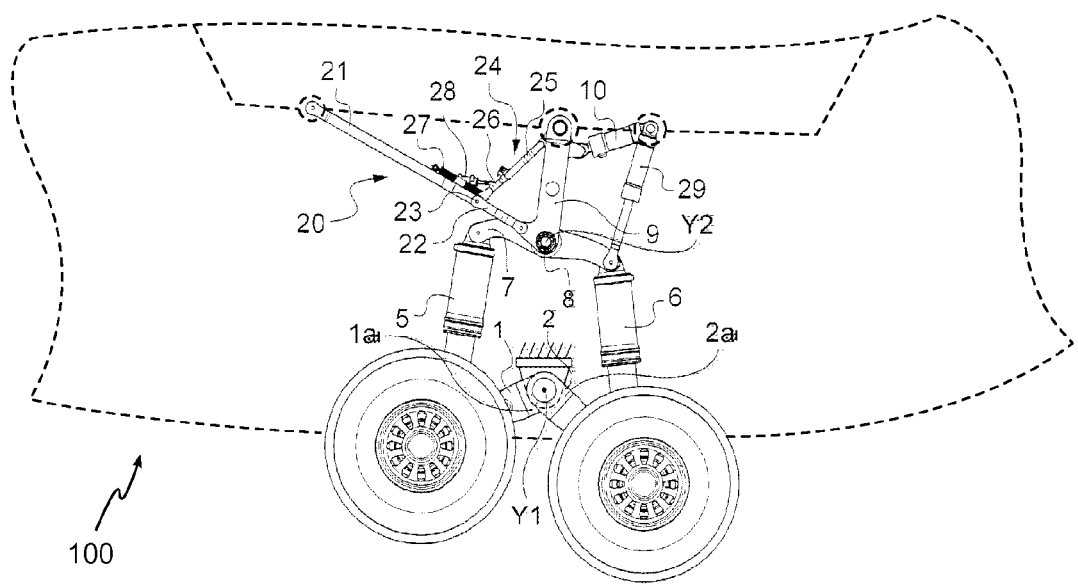
FIGS. 4 and 5 are respectively identical to FIGS. 1 and 3, except in that all of the wheels are shown.
Figure 5:
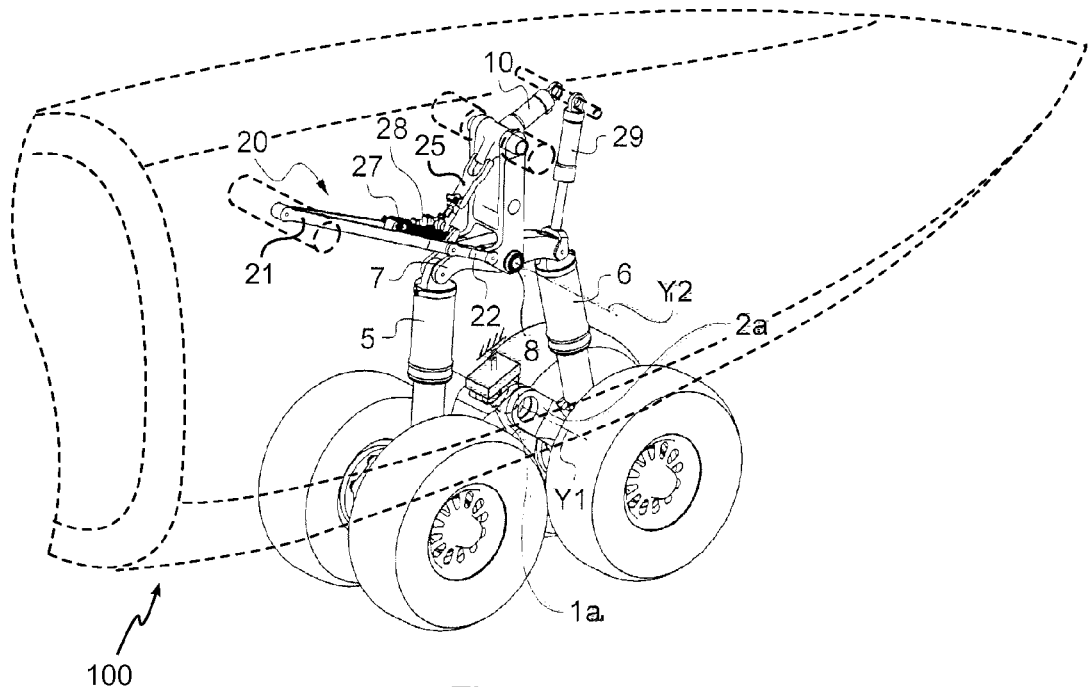

Finally, a threshold telescopic positioner 29 is hinged between the rocker 7 and the structure of the aircraft 100 in order to co-operate with the panel and the rocker to form a deformable parallelogram device that holds the rocker 7 substantially in a position parallel to itself during pivoting of the panel between the active position and the retracted position. Nevertheless, the positioner 29 can shorten under the action of force from the ground tending to cause the rocker to pivot. Thus, and as shown in FIG. 2 in which the rocker beams are in a substantially horizontal position that they adopt when the aircraft 100 is standing on the ground and is loaded to its maximum weight, it can be seen that the shock absorbers 5, 6 are compressed, and also that the positioner 29 is slightly compressed, thereby enabling the rocker 7 to rock under the action of ground loads.

All of the above-mentioned hinges are organized about axes that are all parallel to the axes Y1, Y2, and Y3.

The invention is not limited to the above description, but on the contrary covers any variant coming within the ambit defined by the claims.

In particular, although it is stated that the two connecting rods coupled between the rocker beams and the rocker constitute shock absorbers, it would also be possible for one of the connecting rods to be rigid. Under such circumstances, the other connecting rod constituting the shock absorber would need to have its stroke doubled.

Although the central pivot of the rocker in this example is mounted on a panel that is pivotally mounted on the fuselage to pivot between an active position and a retracted position, the pivot can be made movable by other means, e.g. by mounting the pivot at the end of a telescopic member having extended and retracted positions that correspond to the above-mentioned active and retracted positions.

What is claimed is:

1. An aircraft undercarriage comprising two rocker beams (1, 2) carrying wheels and mounted to pivot on a common pivot (Y1), the undercarriage including a shock-absorber device comprising two connecting rods (5, 6), each of the two connecting rods (5, 6) being coupled to a respective one of the rocker beams, at least one of the connecting rods being telescopic and forming a shock absorber, the two connecting rods also being coupled to a rocker (7) pivotally mounted on a central pivot (8), wherein the common pivot of the rocker beams is secured to a structure of an aircraft to which the undercarriage is fastened and is mounted in a fixed position on said structure, while the central pivot of the rocker is movable between a first position in which the rocker beams are in a landing position, and a second position in which the rocker has pulled on the connecting rods to cause the rocker beams to pivot towards a retracted position of the undercarriage.

2. The aircraft undercarriage according to claim 1, wherein the central pivot of the rocker is mounted at an end of a panel (9), said panel being pivotally mounted on a structure of the aircraft to pivot between an active position of the undercarriage in which the pivot of the rocker is substantially vertically in register with the common pivot of the rocker beams, this active position of the undercarriage corresponding to the landing position of the rocker beams, and a retracted position of the undercarriage in which the rocker has pulled on the connecting rods in order to cause the rocker beams to pivot towards a retracted position of the rocker beams.

3. The aircraft undercarriage according to claim 2, wherein a threshold positioner (29) is coupled between the rocker and the structure of the aircraft to co-operate with the panel and the rocker to form a deformable parallelogram system.

4. The aircraft undercarriage according to claim 2, wherein a driving actuator (10) is coupled between the panel and the structure of the aircraft to cause the panel to pivot selectively between the active position of the undercarriage and the retracted position of the undercarriage.

5. The aircraft undercarriage according to claim 2, wherein an alignment stabilizer device is coupled between the panel and the structure of the aircraft in order to stabilize the panel in the active position.

\* \* \* \* \*